United States Patent
Jonsson et al.

(10) Patent No.: US 9,621,287 B2
(45) Date of Patent: Apr. 11, 2017

(54) ANTENNA PORT DETECTION

(71) Applicant: Telefonaktiebolaget L M Ericsson (publ), Stockholm (SE)

(72) Inventors: Elias Jonsson, Malmö (SE); Dinil Koshy Mathews, Lund (SE); Ioannis Xirouchakis, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/780,690

(22) PCT Filed: Mar. 25, 2014

(86) PCT No.: PCT/EP2014/055953
§ 371 (c)(1),
(2) Date: Sep. 28, 2015

(87) PCT Pub. No.: WO2014/161749
PCT Pub. Date: Oct. 9, 2014

(65) Prior Publication Data
US 2016/0072598 A1    Mar. 10, 2016

(30) Foreign Application Priority Data
Apr. 5, 2013   (EP) .................................. 13162500

(51) Int. Cl.
*H04B 7/0413* (2017.01)
*H04B 17/318* (2015.01)
(Continued)

(52) U.S. Cl.
CPC ......... *H04B 17/327* (2015.01); *H04B 7/0413* (2013.01); *H04B 17/27* (2015.01); *H04B 17/318* (2015.01)

(58) Field of Classification Search
CPC .............................. H04W 36/30; H04B 7/0689
See application file for complete search history.

(56) References Cited

U.S. PATENT DOCUMENTS

| | | | | |
|---|---|---|---|---|
| 2011/0207415 A1* | 8/2011 | Luo | ...................... | H04B 7/0413 455/68 |
| 2011/0217972 A1* | 9/2011 | Vukajlovic Kenehan | ................ | H04B 17/24 455/423 |

(Continued)

FOREIGN PATENT DOCUMENTS

| | | |
|---|---|---|
| WO | 2009095368 A1 | 8/2009 |
| WO | 2010062238 A1 | 6/2010 |

OTHER PUBLICATIONS

Huawei, "Consideration on positioning support for LTE Rel-9", 3GPP TSG RAN WG1#56bis, Seoul, Republic of Korea, Mar. 23, 2009, pp. 1-6, R1-091257, 3GPP.

(Continued)

*Primary Examiner* — Cindy Trandai
(74) *Attorney, Agent, or Firm* — Coats and Bennett, PLLC

(57) ABSTRACT

There is provided presence detection of a second transmit antenna port in a distributed antenna port system. Cell-specific reference signals, CRS, are received on a first receive antenna port and a second receive antenna port. The CRS have been transmitted by a first transmit antenna port and a second transmit antenna port in the distributed antenna port system. Reference signal received power, RSRP, measurements and reference signal resource element received power, RSRERP, measurements are estimated from the CRS. Presence is detected by comparing each one of at least one metric based on filtered RSRP measurements and filtered RSRERP measurements to a respective threshold.

13 Claims, 3 Drawing Sheets

(51) Int. Cl.
  *H04B 17/327* (2015.01)
  *H04B 17/27* (2015.01)

(56) References Cited

U.S. PATENT DOCUMENTS

| | | | | |
|---|---|---|---|---|
| 2011/0310753 | A1* | 12/2011 | Chou | H04W 48/16 370/252 |
| 2012/0038521 | A1* | 2/2012 | Zhu | H04B 17/318 343/703 |
| 2012/0057566 | A1* | 3/2012 | Ahmadi | H04L 12/5692 370/331 |
| 2012/0106346 | A1* | 5/2012 | Aguirre | H04W 28/08 370/237 |
| 2012/0147766 | A1* | 6/2012 | Kim | H04W 24/10 370/252 |
| 2012/0281553 | A1* | 11/2012 | Mujtaba | H04M 1/72519 370/252 |
| 2013/0021926 | A1* | 1/2013 | Geirhofer | H04L 5/0048 370/252 |
| 2013/0051310 | A1* | 2/2013 | Kim | H04L 5/0023 370/315 |
| 2013/0100828 | A1* | 4/2013 | Kishiyama | H04W 52/42 370/252 |
| 2013/0210368 | A1* | 8/2013 | Lee | H04B 17/318 455/67.11 |
| 2013/0244594 | A1* | 9/2013 | Alrabadi | H04B 7/0413 455/78 |
| 2013/0303178 | A1* | 11/2013 | Jitsukawa | H04W 72/0406 455/450 |
| 2014/0092786 | A1* | 4/2014 | He | H04W 52/0258 370/280 |
| 2014/0105120 | A1* | 4/2014 | Jose | H04W 72/042 370/329 |
| 2014/0233408 | A1* | 8/2014 | Bontu | H04W 36/0094 370/252 |
| 2014/0362953 | A1* | 12/2014 | Zhang | H04B 7/0413 375/340 |
| 2015/0024738 | A1* | 1/2015 | Anderson | H04W 36/0066 455/432.1 |

OTHER PUBLICATIONS

Qualcomm Europe, "2 Tx RSRP Measurements", 3GPP TSG-RAN WG4 #50, Feb. 9, 2009, pp. 1-4, R4-090729, 3GPP.

Ericsson, "Analysis of UE Measurements using Single or Dual Antenna Ports," 3GPP TSG-RAN WG4 Meeting #49, Prague, Czech Republic, Nov. 10, 2008, pp. 1-3, R4-083008.

Motorola, "Antenna Configuration Detection Based on Reference Signal Energy," 3GPP TSG RAN1#51bis, Sevilla, Spain, Jan. 14, 2008, pp. 1-11, R1-080434.

Nokia Siemens Networks, et al., "Issue with PBCH-based Blind Antenna Configuration Detection," 3GPP TSG RAN WG1 #51bis Meeting, Sevilla, Spain, Jan. 14, 2008, pp. 1-7, R1-080324.

CMCC, et al. "RSRP Measurement with Multiple Antenna Ports," TSG-RAN Working Group 4 (Radio) meeting #49bis, Aubljana, Slovenia, Jan. 12, 2009, pp. 1-9, R4-090337.

* cited by examiner

ANTENNA PORT DETECTION

TECHNICAL FIELD

Embodiments presented herein relate to antenna port detection, and particularly to a method, a user equipment and a computer program for detecting presence of a second transmit antenna port in a distributed antenna port system.

BACKGROUND

In mobile communication networks, there is always a challenge to obtain good performance and capacity for a given communications protocol, its parameters and the physical environment in which the mobile communication network is deployed. The evolution of the Universal Mobile Telecommunications Standard Long Term Evolution (UMTS LTE) standard for mobile communications continues with new features to increase the overall capacity and to increase the general performance of the communications network.

The 3GPP TS 36.211 specification entitled "LTE; Evolved Universal Terrestrial Radio Access (E-UTRA); Physical channels and modulation" defines antenna ports for the downlink (i.e. for transmission from a network node, such as an evolved Node B, eNB, to a wire device, such as a user equipment, UE). An antenna port is generally used as a generic term for signal transmission under identical channel conditions. For each LTE operating mode in the downlink direction for which an independent channel is assumed, a separate logical antenna port is defined. LTE symbols that are transmitted via identical antenna ports are subject to the same channel conditions. In order to determine the characteristic channel for an antenna port, a UE must today carry out separate channel estimation for each antenna port. Separate reference signals (pilot signals) that are suitable for estimating the respective channel are defined in the LTE standard for each antenna port.

Further, coordinated multi-point transmission/reception (CoMP) is one concept that was first introduced in Release 10 of LTE. In CoMP, UEs can receive coordinated data transmissions from multiple sectors or cells. In CoMP scenarios, it may be advantageous to map transmitter (TX) antenna ports of the network node to geographically separated antennas at different transmission points (TPs) within a cell of the network node. Commonly there may be in the order of 1 to 8 antenna ports.

The way in which these logical antenna ports are assigned to the physical transmit antennas of a network node is up to the network node, and can vary between network nodes of the same type (because of different operating conditions) and also between network nodes from different manufacturers. The network node does not explicitly notify the UE of the mapping that has been carried out, rather the UE must today take this into account automatically during demodulation.

There is thus a need for an improved detection of transmit antenna ports at the UE.

SUMMARY

An object of embodiments herein is to provide detection of transmit antenna ports at a user equipment.

The inventors of the enclosed embodiments have realized that today, robust detection of transmit antenna ports in LTE systems for a cell being interfered by another stronger cell is not possible. A particular object is therefore to provide detection of transmit antenna ports at a user equipment for detecting presence of a second transmit antenna port at a user equipment in a distributed antenna port system.

According to a first aspect there is presented a method for detecting presence of a second transmit antenna port in a distributed antenna port system. The method is performed in a user equipment. The method comprises receiving cell-specific reference signals, CRS, on a first receive antenna port and a second receive antenna port. The CRS have been transmitted by a first transmit antenna port and a second transmit antenna port in the distributed antenna port system. The method comprises estimating reference signal received power, RSRP, measurements from the CRS for all transmit-receive antenna port combinations. The method comprises filtering the RSRP measurements so as to obtain filtered RSRP measurements. The method comprises estimating reference signal resource element received power, RSRERP, measurements from the CRS for the second transmit antenna port in combination with each receive antenna port. The method comprises filtering the RSRERP measurements so as to obtain filtered RSRERP measurements. The method comprises determining a signal to interference and noise ratio, SINR, based on the filtered RSRP of the second transmit antenna port and the filtered RSRERP of the second transmit antenna port. The method comprises determining, based on comparing the SINR to a first threshold, $SINR_{thr}$, whether the second transmit antenna port is present or not Advantageously the method enables robust detection if the second transmit antenna port is used by a network node without decoding the PBCH. By robustly being able to detect a second transmit antenna port the UE could in idle mode save power by shortening the radio on times necessary for achieving required measurement accuracy.

According to a second aspect there is presented a user equipment, UE, for detecting presence of a second transmit antenna port in a distributed antenna port system. The UE comprises a first receive antenna port and a second receive antenna port arranged to receive cell-specific reference signals, CRS. The CRS have been transmitted by a first transmit antenna port and a second transmit antenna port in the distributed antenna port system. The UE comprises a processing unit arranged to estimate reference signal received power, RSRP, measurements from the CRS for all transmit-receive antenna port combinations. The processing unit is further arranged to filtering the RSRP measurements so as to obtain filtered RSRP measurements. The processing unit is further arranged to estimate reference signal resource element received power, RSRERP, measurements from the CRS for the second transmit antenna port in combination with each receive antenna port. The processing unit is further arranged to filter the RSRERP measurements so as to obtain filtered RSRERP measurements. The processing unit is further arranged to determine a signal to interference and noise ratio, SINR, based on the filtered RSRP of the second transmit antenna port and the filtered RSRERP of the second transmit antenna port. The processing unit is further arranged to determine, based on comparing the SINR to a first threshold, $SINR_{thr}$, whether the second transmit antenna port is present or not According to a third aspect there is presented a computer program for detecting presence of a second transmit antenna port in a distributed antenna port system, the computer program comprising computer program code which, when run on a UE, causes the UE to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
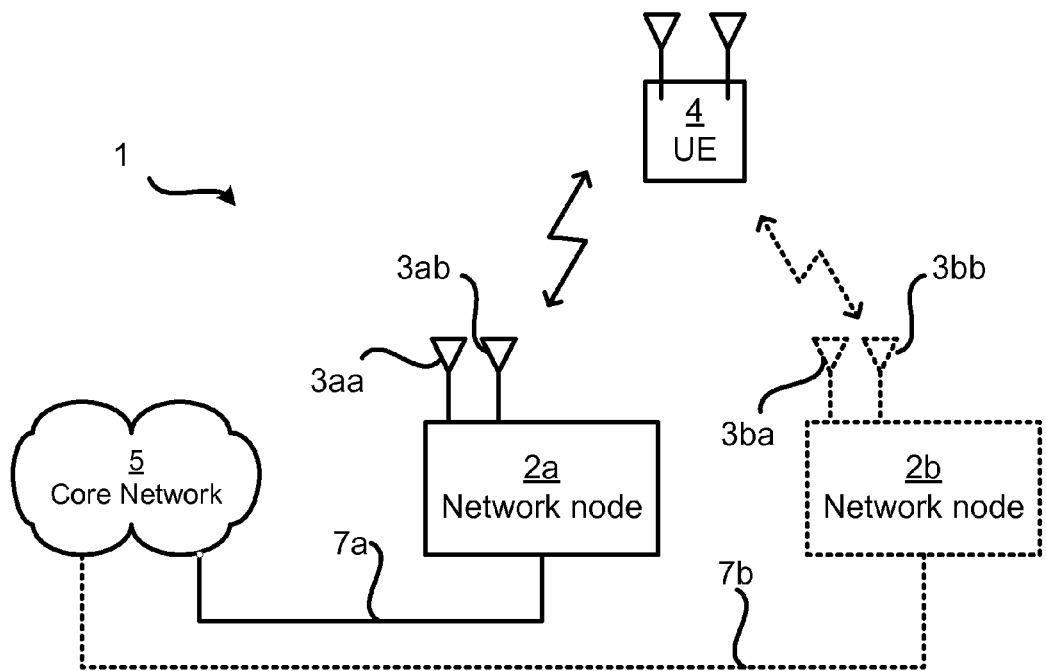
FIG. 1 is a schematic diagram illustrating a mobile communication network where embodiments presented herein may be applied.

FIG. 1 is a schematic diagram illustrating a mobile communication network 1 where embodiments presented herein can be applied. The mobile communications network 1 comprises a first network node 2a and optionally a second network node 2b. The mobile communications network 1 further comprises a user equipment (UE) 4. Generally, the network nodes 2a-b provides radio connectivity to a plurality of UE 4. The term UE is also known as mobile communication terminal, mobile terminal, user terminal, user agent, or other wireless device etc. The communication between the UE 4 and the network node S2 occurs over a wireless radio interface.

The mobile communication network 1 may generally comply with the LTE standard. The mobile communication network 1 is the evolved UMTS Terrestrial Radio Access Network (E-UTRA) in one embodiment. Typically the E-UTRA network consists only of network nodes 2a-b in the form of eNBs (E-UTRAN NodeB, also known as Evolved NodeB) on the network side. The eNB is the hardware that is connected to the service and content providing packet switched core network 5 and that communicates directly with the UE 4. Several eNBs may typically connected to each other via the so-called X2 interface, and they connect to the packet switched core network 5 via the so-called S1 interface (as illustrated by reference numerals 7a and 7b). The network node 2 generally comprises a number of antenna ports K associated via a precoder with a number K of antenna elements 3a, 3b, 3K (thus one antenna port corresponds to one or more antenna elements via a mapping. One port can further be a linear combination of one or more antenna elements). In the illustrative example of FIG. 1, each network node 2a-2b is associated with a first antenna port 3aa, 3ba and a second antenna port 3ab, 3bb. The mobile communication network 1 may therefore be denoted a distributed antenna port system.

LTE uses orthogonal frequency-division multiplexing (OFDM) for the downlink transmission (i.e. from network node to UE) and DFT-spread OFDM for the uplink transmission (i.e. from UE to network node). In the time domain, LTE downlink transmissions are organized into radio frames of 10 ms, each radio frame comprising ten equally-sized subframes of length T=1 ms. Furthermore, the resource allocation in LTE is typically described in terms of resource blocks (RB), where a resource block corresponds to one slot (0.5 ms) in the time domain and 12 contiguous subcarriers SC1-SC12 in the frequency domain.

In general terms, the LTE physical channels vary between the uplink and the downlink as each has different requirements and operates in a different manner. The Physical Broadcast Channel (PBCH) carries system information for UEs requiring to access the network. It only carries what is termed Master Information Block, MIB, messages. The modulation scheme is always QPSK and the information bits are coded and rate matched. The bits are then scrambled using a scrambling sequence specific to the cell to prevent confusion with data from other cells. The MIB message on the PBCH is mapped onto the central 72 subcarriers or six central resource blocks regardless of the overall system bandwidth. A PBCH message is repeated every 40 ms, i.e. one TTI of PBCH includes four radio frames. The PBCH transmissions has 14 information bits, 10 spare bits, and 16 CRC bits.

Downlink transmissions are dynamically scheduled, i.e., in each subframe the network node transmits control information about to which terminals data is transmitted and upon which resource blocks the data is transmitted, in the current downlink subframe. This control signalling is typically transmitted in the first 1, 2, 3 or 4 OFDM symbols in each subframe and is known as the Control Format Indicator (CFI). The downlink subframe also contains common reference signals (CRS), which are known to the receiver (i.e. the UE) and used for coherent demodulation of e.g. the control information. Different Reference Signals (RS) may be used for estimating the channel properties, like the Cell-specific RS (CRS), the Demodulation RS (DM-RS) and the Channel State Information RS (CSI-RS). Each RS is mapped to a TX antenna port. The CRS are transmitted in every downlink resource block and cover the entire cell bandwidth. The CRS can be used for coherent demodulation of all downlink physical channels except for the PMCH (Physical Multicast Channel) and for the PDSCH (Physical Downlink Shared Channel) in case of transmission mode 7, 8 and 9. DM-RS are UE specific reference signals intended to be used for channel estimation for PDSCH in transmission mode 7, 8 and 9. The DM-RS are typically only transmitted within the resource blocks assigned to the specific UE.

In a typical scenario, the UE 4 receives information from a network node 2a in a serving cell and is interfered by a signal from a network node 2b in a neighboring cells. The UE 4 has to continuously measure the power from the detected neighboring cells and the serving cell to decide when to handover to a neighboring cell.

During cell measurement, the UE 4 has knowledge of the number of transmit antenna ports 3aa, 3ab only for the serving cell and not for the number of transmit antenna ports 3ba, 3bb for the neighboring cells. The herein discloses subject matter pertains to detection of the second transmit port for the neighboring cell without decoding the PBCH.

The embodiments disclosed herein relate to detecting presence of a second transmit antenna port. In general terms, an antenna port is present if the eNodeB transmits CRS on the Resource Elements (REs) corresponding to that port. This is explained in more detail with reference to FIG. 6.10.1.2-1 in the above referenced 3GPP TS 36.211 specification. In order to obtain such presence detection there is provided a method performed in the UE, a computer program comprising code, for example in the form of a computer program product, that when run on a UE, causes the UE to perform the method.

Figure 2:
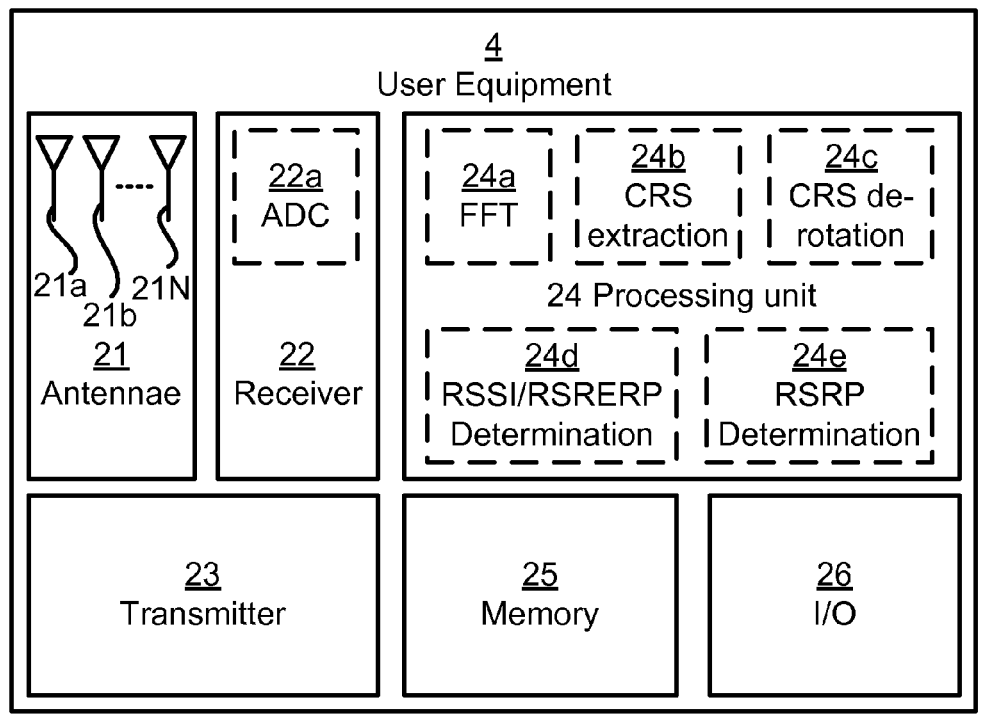
FIG. 2 is a schematic diagram showing functional modules of a user equipment.

FIG. 2 schematically illustrates, in terms of a number of functional modules, the components of a UE 4. A processing unit 24 is provided using any combination of one or more of a suitable central processing unit (CPU), multiprocessor, microcontroller, digital signal processor (DSP), application specific integrated circuit (ASIC) etc., capable of executing software instructions stored in a computer program product 30 (as in FIG. 3), e.g. in the form of a memory 25. Thus the processing unit 24 is thereby arranged to execute methods as herein disclosed. The memory 25 may also comprise persistent storage, which, for example, can be any single one or combination of magnetic memory, optical memory, solid state memory or even remotely mounted memory.

The processing unit 24 may comprise functional modules 24a, 24b, 24c, 24d, and 24e. These functional modules 24a-e may be implemented in hardware, software, or a combination thereof. Functional module 24a is arranged to perform frequency transformation on an input signal (such as a signal provided by the receiver 22, see below). The frequency transformation may be a fast Fourier transformation (FFT). Functional module 24b is arranged to perform CRS extraction on an input signal (such as a signal provided by the functional module 24a). Functional module 24c is arranged to perform CRS de-rotation on an input signal (such as a signal provided by the functional module 24b). Functional module 24d is arranged to perform RSSI and/or RSRERP determination on an input signal (such as a signal provided by the functional module 24b). Functional module 24b is arranged to perform RSRP determination on an input signal (such as a signal provided by the functional module 24c).

The UE 4 may further comprise an input/output (I/O) interface 26 for receiving and providing information to a user interface. The UE 4 also comprises one or more transmitters 23 and receivers 22, comprising analogue and digital components forming the functionalities of a transmitter and a receiver, and a suitable number of antennae 21 having K antenna elements 21a, 21b, . . . , 21K for radio communication with network nodes 2a, 2b. The receiver 22 may comprise a functional module 22a. This functional module 22a may be implemented in hardware, software, or a combination thereof. Functional module 24d is arranged to perform analogue to digital conversion (ADC) of an input signal (such as a signal provided by the antennae 21).

The processing unit 24 controls the general operation of the UE 4, e.g. by sending control signals to the transmitter 23 and/or receiver 22, receiving reports from the transmitter 23 and/or receiver 22 of its operation, fetching instructions and data from the memory 25 and/or the I/O interface 26, and providing instructions and data to the same. Other components, as well as the related functionality, of the UE 4 are omitted in order not to obscure the concepts presented herein.

Figure 3:
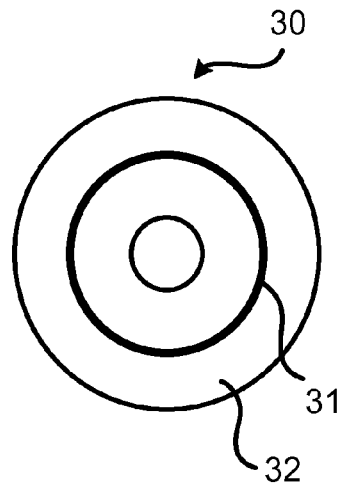
FIG. 3 shows one example of a computer program product comprising computer readable means.
Figure 4:
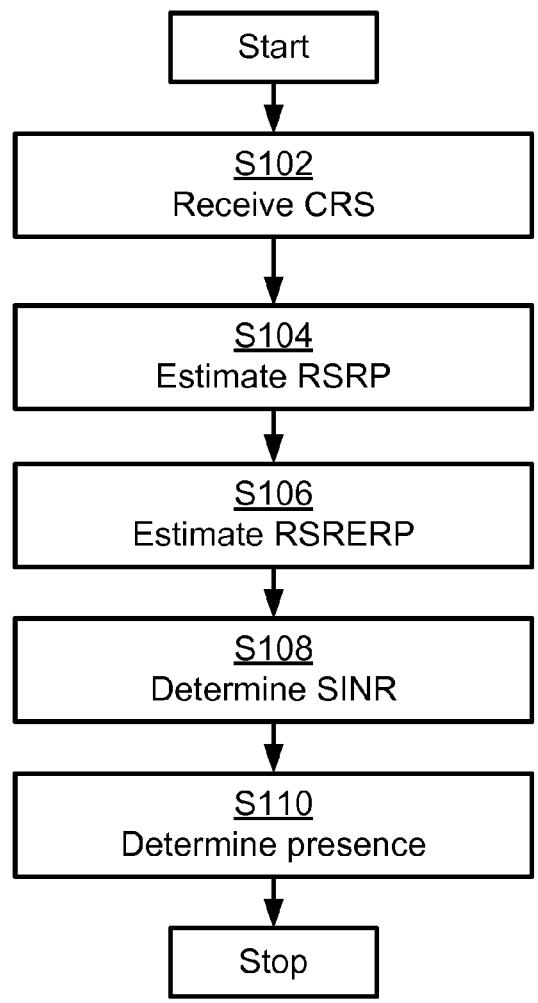
FIGS. 4 and 5 are flowcharts of methods according to embodiments.
Figure 5:
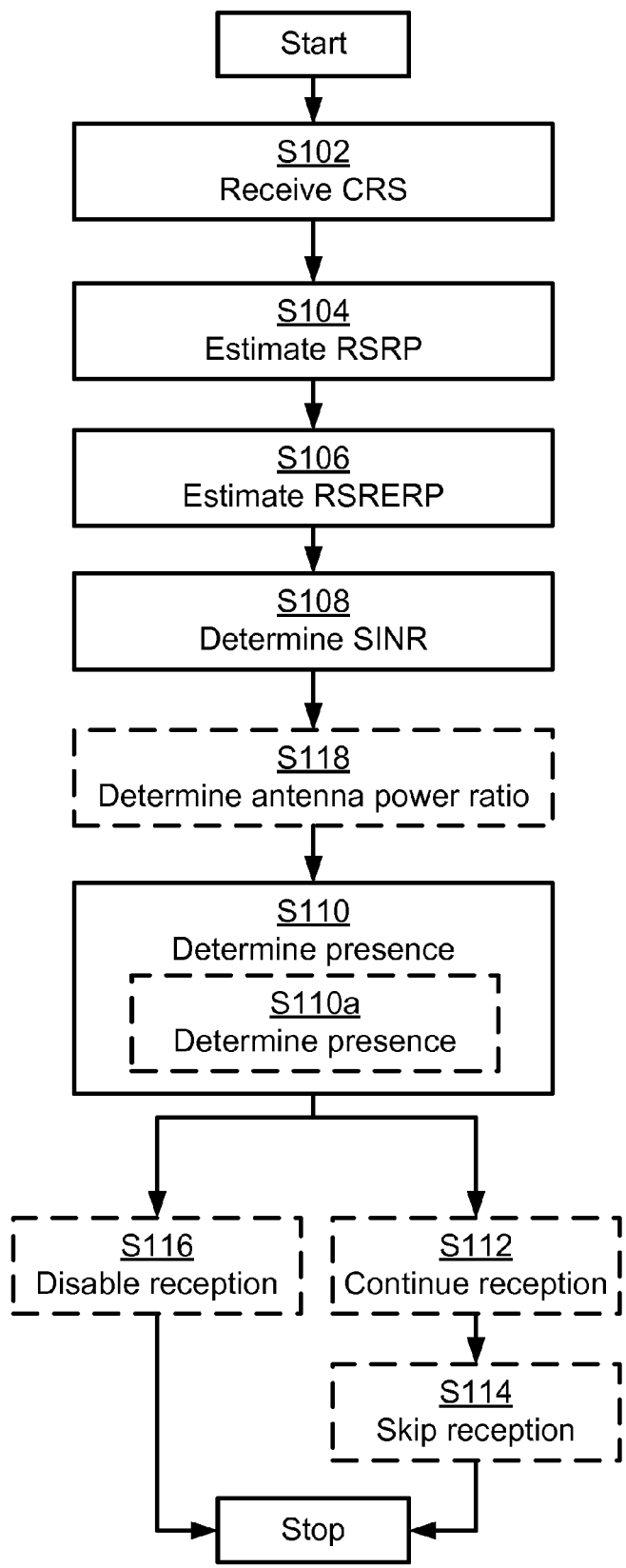

FIGS. 4 and 5 are flow charts illustrating embodiments of methods for detecting presence of a second transmit antenna port. The methods are performed in the UE 4. The methods are advantageously provided as computer programs 31. FIG. 3 shows one example of a computer program product 30 comprising computer readable means 32. On this computer readable means 32, a computer program 31 can be stored, which computer program 31 can cause the processing unit 24 and thereto operatively coupled entities and devices, such as the memory 25, the I/O interface 26, the transmitter 23, the receiver 22 and/or the antennae 21 to execute methods according to embodiments described herein. In the example of FIG. 3, the computer program product 30 is illustrated as an optical disc, such as a CD (compact disc) or a DVD (digital versatile disc) or a Blu-Ray disc. The computer program product could also be embodied as a memory (RAM, ROM, EPROM, EEPROM) and more particularly as a non-volatile storage medium of a device in an external memory such as a USB (Universal Serial Bus) memory. For example, the computer program 31 may be stored in the memory 25 of the UE 4. Thus, while the computer program 31 is here schematically shown as a track on the depicted optical disk, the computer program 31 can be stored in any way which is suitable for the computer program product 30.

Returning now to FIG. 1, cell reference signals from antenna port 0 (hereinafter denoted the first transmit antenna port) and 1 (hereinafter denoted the second transmit antenna port) are in most situations transmitted with the same power in a case where both transmit antenna ports are located at the same geographical location. However, although the transmit antenna ports are located at the same geographical location the transmitted power vary. In general terms, the power of the transmit antenna ports can vary due to two conditions. Firstly, the second transmit antenna port can be switched off according to some form of energy saving scheme. This will be rarely done, maybe in order of few times per day only. Secondly, the first transmit antenna port and the second transmit antenna port may be part of a distributed antenna system where port 0 is transmitted from one location and port 1 is transmitted from another location.

As will be further disclosed below, the second transmit port is detected by defining suitable metric values derived from measurements made for the second transmit antenna port of a (network node 2b in a) neighboring cell. Two different metrics may be used (either separately or in combination) to identify if the second transmit port is used for transmission. The first metric relates to the antenna power ratio, i.e. the ratio of the second transmit antenna port power to the first transmit antenna port power of the neighboring cell. The second metric relates to the approximate signal to interference ratio (SINR) defined as the ratio of the second transmit antenna port power of the neighboring cell to the total received power (which includes the second transmit antenna port power, interference from the serving cell and noise).

A method for detecting presence of a second transmit antenna port 3ab, 3ba, 3bb in a distributed antenna port system comprises, in a step S102, receiving cell-specific reference signals, CRS. The CRS are received on a first receive antenna port 21a and a second receive antenna port 21b of the UE 4. The CRS have been transmitted by a first transmit antenna port 3aa and a second transmit antenna port 3ab, 3ba, 3bb in the distributed antenna port system. The CRS may be extracted from the total received signal by the CRS extraction functional unit 24b of the processing unit 24.

The presence detection is based on reference signal received power (RSRP) measurements and reference signal resource element received power (RSRERP) measurements for particular transmit-receive antenna port combinations. RSRP (in general terms representing cell and antenna port specific transmit power) and RSRERP (in general terms representing the total received power) values are determined from cell measurements and the determined values are then filtered before being further used for presence detection purposes. Particularly, the processing unit 24 of the UE 4 is arranged to, in a step S104, estimate reference signal received power (RSRP) measurements from the CRS for all transmit-receive antenna port combinations. The RSRP estimation may be performed by the RSRP determination functional unit 24e of the processing unit 24. Examples of how the RSRP estimation may be performed will be provided below. The estimated RSRP measurements are filtered so as to obtain filtered RSRP measurements. Further, the processing unit 24 of the UE 4 is arranged to, in a step S106, estimate reference signal resource element received power (RSRERP) measurements from the CRS for the second transmit antenna port (denoted Tx1 below) in combination with each receive antenna port. The RSRERP estimation may be performed by the RSSI/RSRERP determination functional unit 24d of the processing unit 24. The estimated RSRERP measurements are filtered so as to obtain filtered RSRERP measurements.

The filtered RSRP measurements and the RSRERP measurements are then used as input to at least one metric.

A first metric concerns signal to interference and noise ratio (SINR). In general terms, if transmit port 1 is not enabled then the transmit power (as defined by the RSRP) of transmit port 1 should be (substantially) smaller than the total transmit power (as defined by the RSRERP) of transmit port 1. A suitable threshold for ratio of RSRP to RSRERP (referred to as SINR) is therefore defined such that the ratio will be above this threshold when transmit port 1 (i.e., the second transmit antenna port) is enabled. If the ratio is less than this threshold it is concluded that transmit port 1 is not present (i.e., not enabled). Particularly, the processing unit 24 of the UE 4 is arranged to, in a step S108, determine a signal to interference and noise ratio, SINR, based on the filtered RSRP of the second transmit antenna port and the filtered RSRERP of the second transmit antenna port.

As noted above, the first metric (i.e. the SINR) is then compared to a first threshold, $SINR_{thr}$. The processing unit 24 of the UE 4 is arranged to, in a step S110, determine, based on the comparison of the SINR to the first threshold, $SINR_{thr}$, whether the second transmit antenna port is present or not. That is, if $SINR > SINR_{thr}$ it may be concluded that the second transmit antenna port is present and of the same strength as the first transmit antenna port. This may further indicated that the second transmit antenna port is positioned geographically close to the first transmit antenna port. Otherwise it may be concluded that the second transmit antenna port is not present. According to embodiments, as based on extensive simulations over different channel conditions, $SINR_{thr}$ can be set to −8 dB.

As noted above, there may be at least one metric. A second metric, which may be independently used or in combination with the first metric, concerns the ratio of the power of the second transmit antenna port to the power of the first transmit antenna port. In general terms, the ratio of the power of transmit power from transmit port 1 to transmit port 0 should be on average equal to one. Particularly, the processing unit 24 of the UE 4 is arranged to, in a step S118, determine an antenna power ratio, G, based on the filtered RSRP of the second transmit antenna port and the filtered RSRP of the first transmit antenna port. The processing unit 24 of the UE 4 is further arranged to, in a step S110a, determine whether the second transmit antenna port is present or not also based on comparing G to a second threshold, $G_{thr}$. For example, G may be compared to $G_{thr}$ from both below and above; the second transmit antenna port may be present if $G_{thr}^{-1} < G < G_{thr}$. According to embodiments, as based on extensive simulations over different channel conditions, $G_{thr}$ can be set to −2 dB.

Any of the above detection algorithms (as defined by any combination of steps S102-S118) may by the processing unit 24 be executed after cell validation in order to track any changes in the signal strength from the second transmit antenna port. In general terms, cell validation is a period of a short number of cell measurements after a neighbor cell is found from background cell search. During this period the cell may thus be measured and each such period it may be determined if this cell (as defined by the signal strength from the second transmit antenna port) is strong enough to continue measuring on.

For example, if a second antenna is detected, then there are twice as many resource elements to determine RSRP measurements with. Consequently the number of required measurement occasions to fulfil any accuracy requirements for the RSRP measurements may be reduced. Particularly, the receiver 22 may be arranged to, in an optional sub-step S112, continue measuring from the second transmit antenna port in a case the second transmit antenna port is determined to be present.

Detection of the second transmit antenna port may allow measurement occasions to be skipped, thus facilitating energy savings. For example, in a case the second transmit antenna port is detected the next measurement occasion can be skipped. This could save power consumption in idle mode by using less of radio time. Particularly, the receiver 22 may be arranged to, in an optional sub-step S114, skip reception on the first receive antenna port during a next measurement occasion. For example, reception may be skipped on all receive antenna ports. That is, the number of measurements occasions can be cut in half. Thus, the receiver 22 may be arranged to skip reception on all receive antenna ports during the next measurement occasion.

Further, if the second transmit antenna port is not detected measurements therefrom may be disabled. This may facilitate energy savings by avoiding unnecessary processing. Particularly, the receiver 22 may be arranged to, in an optional sub-step S116, disable measuring from the second transmit antenna port in a case said second transmit antenna port is not present. For example, in terms of the second metric as defined above, if the power of transmit port 1 when compared to transmit port 0 falls below a particular threshold, the second transmit port may be disabled.

Embodiments disclosing different ways to estimate RSRP measurements and RSRERP measurements will be provided next.

In general terms, transmit antenna port powers may be determined as the RSRP by de-rotating the received signals using the cell reference signals (CRS) followed by taking the power of the sum of de-rotated received signals. The total power over the bandwidth (which may be defined by the received signal strength indication, RSSI) refers to the power detected from all resource elements. Herein a scaled version of the RSSI is used; the RSRERP, which may represent RSSI per CRS resource element. According to the 3GPP 36.214 specification entitled "Evolved Universal Terrestrial Radio Access (E-UTRA); Physical layer; Measurements" RSRP measurements should be estimated using CRS on receive antenna port 0 and possibly also on receive antenna port 1 if receive antenna port 1 can be reliably detected by the UE 4. Typically, the unfiltered RSRP (hereinafter denoted rsrp) is determined as $$rsrp = P - \text{bias} \quad (1)$$

where $$P = \frac{1}{M} \sum_{m=1}^{M} \left| \frac{1}{|S_m|} \sum_{(k,l) \in S_m} H_{k,l} \right|^2, \quad (2)$$

$$\text{bias} = \frac{|S_m| - 1}{|S_m|} (rsrerp - P), \quad (3)$$

and $$rsrerp = \frac{1}{M} \frac{1}{|S_m|} \sum_{m=1}^{M} \sum_{(k,l) \in S_m} |H_{k,l}|^2 \quad (4)$$

Here, $H_{k,l}$ are the de-rotated received symbols in frequency domain for CRS at receive antenna port 0, OFDM symbol l, and frequency index k. The set $S_m$ is a set of CRS symbols that the de-rotated symbols is averaged over in order to remove noise. This is sometimes also referred to as coherent summation. Here $|S_m|$ is the number of elements in the set $S_m$. The sets $S_m$ are enumerated using the index m. Typically, the set $S_m$ consists of all CRS symbols in an RB (resource block) and the number of sets $S_m$ could depend on the bandwidth; for example, if 1.4 MHz then M=6. In equations (1)-(4) both rsrp and rsrerp are unfiltered.

SINR Metric

In general terms, RSRERP values reflect the total received power, i.e., without prior de-rotation of the CRS signal before calculating power for each resource element, see the disclosure regarding RSSI above. Hereinafter one snapshot refers to one subframe.

According to one embodiment the SINR metric is determined as follows. First the RSRP is determined for the second transmit antenna port in combination with each receive antenna port as follows:

$$RSRP_{R\times b}^{T\times a}(m) = (1 - \lambda_{rsxx})RSRP_{R\times b}^{T\times a}(m-1) + \lambda_{rsxx}\left(\frac{1}{K}\sum_{k=0}^{K} rsrp_{R\times b}^{T\times a}(m,k)\right),$$

$$m = 1 \ldots (M-1)$$

where $$RSRP_{R\times b}^{T\times a}(0) = \frac{1}{K}\sum_{k=0}^{K} rsrp_{R\times b}^{T\times a}(0,k).$$

Here, m∈[0,M−1] is the measurement occasion index; M is the total number of measurement occasions; K is the number of snapshots per measurement occasion (for example, K=2). As above, rsrp denotes unfiltered reference signal received power measurements and RSRP denotes filtered reference signal received power measurements. Particularly, $rsrp_{Rxb}^{Txa}(m,k)$ is the unfiltered RSRP values determined for the k:th snapshot of measurement occasion m for transmit antenna port a and receive antenna port b. Similarly, $RSRP_{Rxb}^{Txa}(m,k)$ is the filtered RSRP values for transmit antenna port a and receive antenna port b.

The expression for RSRP is recursive; the value for RSRP at a current measurement occasion m depends on the value for RSRP at the most recent previous measurement occasion m−1. It further depends on K unfiltered rsrp snapshot values for measurement occasion m. The trade-off between the direct term rsrp and the most recent previous RSRP is balanced by a filter coefficient $\lambda_{rsxx}$. The filter coefficient may thus be used to smooth RSRP values (as well as RSRERP values, see below). Experimental results indicate that $\lambda_{rsxx} \approx 2^{-6}$ yield good separation between cases where transmit port 1 is disabled or enabled.

The RSRERP is determined for the second transmit antenna port in combination with each receive antenna port:

$$RSRERP_{R\times b}^{T\times a}(m) =$$

$$(1 - \lambda_{rsxx})RSRERP_{R\times b}^{T\times a}(m-1) + \lambda_{rsxx}\left(\frac{1}{K}\sum_{k=0}^{K} rsrerp_{R\times b}^{T\times a}(m,k)\right),$$

$$m = 1 \ldots (M-1)$$

where $$RSRERP_{R\times b}^{T\times a}(0) = \frac{1}{K}\sum_{k=0}^{K} rsrerp_{R\times b}^{T\times a}(0,k).$$

Again, m∈[0,M−1] is the measurement occasion index; M is the total number of measurement occasions; K is the number of snapshots per measurement occasion (for example, K=2). As above, rsrerp denotes unfiltered reference signal resource element received power measurements and RSRERP denotes filtered reference signal resource element received power measurements. Here $rsrerp_{Rxb}^{Txa}(m,k)$ is the unfiltered RSRERP values determined for the k:th snapshot of measurement occasion m for transmit antenna port a and receive antenna port b. Similarly, $RSRERP_{Rxb}^{Txa}(m,k)$ is the filtered RSRERP values for transmit antenna port a and receive antenna port b.

Similar to RSRP, the expression for RSRERP is also recursive.

The SINR (i.e., the first metric) may then for two transmit antenna ports (Tx0 and Tx1) and two receive antenna ports (Rx0 and Rx1) be expressed as:

$$SINR(m) = \frac{1}{2}\left(\frac{RSRP_{R\times 0}^{T\times 1}(m)}{RSRERP_{R\times 0}^{T\times 1}(m)} + \frac{RSRP_{R\times 1}^{T\times 1}(m)}{RSRERP_{R\times 1}^{T\times 1}(m)}\right)$$

In general terms, there may be $N_r$ receive antenna ports. The SINR for measurement occasion m may then be determined as:

$$SINR(m) = \frac{1}{N_r} \sum_{i=0}^{N_r-1} \frac{RSRP_{R \times i}^{T \times 1}(m)}{RSRERP_{R \times i}^{T \times 1}(m)}$$

where $RSRP_{Rxi}^{Tx1}(m)$ is the filtered RSRP for the second transmit antenna port at the i:th receive antenna port and where $RSRERP_{Rxi}^{Tx1}(m)$ is the filtered RSRERP for the second transmit antenna port at the i:th receive antenna port.

Antenna Power Ratio Metric

The antenna power ratio (i.e. the second metric) can be derived from the unfiltered RSRP values as determined above. According to one embodiment the filtered antenna power ratio is determined as follows. Firstly, filtered RSRP values are determined according to:

$$RSRP_{R \times b}^{T \times a}(m) = (1 - \lambda_{rsxx}) RSRP_{R \times b}^{T \times a}(m-1) + \lambda_{rsxx}\left(\frac{1}{K}\sum_{k=0}^{K} rsrp_{R \times b}^{T \times a}(m,k)\right),$$

$$m = 1 \ldots (M-1)$$

$$RSRP_{R \times b}^{T \times a}(0) = \frac{1}{K}\sum_{k=0}^{K} rsrp_{R \times b}^{T \times a}(0,k)$$

As noted above, rsrp denotes unfiltered reference signal received power measurements and RSRP denotes filtered reference signal received power measurements; $rsrp_{Rxb}^{Txa}(m,k)$ is the unfiltered RSRP values determined for the k:th snapshot of measurement occasion m for transmit antenna port a and receive antenna port b. $RSRP_{Rxb}^{Txa}(m)$ is the filtered RSRP for transmit antenna port a and receive antenna port b for measurement occasion m. The filter coefficient $\lambda_{rsxx}$ is defined as above.

The antenna power ratio, G(m), for each measurement occasion m may then for two transmit antenna ports (Tx0 and Tx1) and two receive antenna ports (Rx0 and Rx1) be expressed as:

$$G(m) = \frac{1}{2}\left(\frac{RSRP_{R \times 0}^{T \times 1}(m)}{RSRP_{R \times 0}^{T \times 0}(m)} + \frac{RSRP_{R \times 1}^{T \times 1}(m)}{RSRP_{R \times 1}^{T \times 0}(m)}\right)$$

Further, as noted above, there may be $N_r$ receive antenna ports. The ratio G for measurement occasion m may then be determined as:

$$G(m) = \frac{1}{N_r} \sum_{i=0}^{N_r-1} \frac{RSRP_{R \times i}^{T \times 1}(m)}{RSRP_{R \times i}^{T \times 0}(m)}$$

where $RSRP_{Rxi}^{Tx1}(m)$ is the filtered RSRP for the second transmit antenna port at the i:th receive antenna port and where $RSRP_{Rxi}^{Tx0}(m)$ is the filtered RSRP for the first transmit antenna port at the i:th receive antenna port.

Tables 1 and 2 indicate in percentage the probability of presence detection (Pr. Det. (%)) and the probability of false alarm (Pr. FA (%)), i.e., to falsely detecting presence. Results are given for cases where there are two receive antenna ports. In Table 1 results are provided for overlapping CRS (OL) as well as for non-overlapping CRS (NOL), respectively. The results in Table 2 are provided for overlapping CRS. In Table 1 the filter coefficient $\lambda_{rsxx}$ was set to $\lambda_{rsxx}=0.15$ and in Table 2 $\lambda_{rsxx}=2^{-6}$. Both tables present results with the $SINR_{cell2}$ from the interfering network node set to $SINR_{cell2}=-6$ dB. Results are provided for different channels (denoted AWGN, EPA5, ETU70 and ETU300). In Table 1 the results are compared for using only the first metric (SINR) and using only the second metric (antenna power ratio). In Table 2 results are also provided for using both metrics.

TABLE 1

Performance results for presence detection at $SINR_{cell2} = -6$ dB, $\lambda_{rsxx} = 0.15$

| | | AWGN | EPA5 | ETU70 | ETU300 |
|---|---|---|---|---|---|
| | | SINR | | | |
| OL | Pr. Det. (%) | 100 | 99.3927 | 100 | 99.3252 |
| | Pr. FA (%) | 0 | 0 | 0 | 0 |
| NOL | Pr. Det. (%) | 100 | 99.4602 | 100 | 100 |
| | Pr. FA (%) | 0 | 0.0675 | 0.2699 | 0.0675 |
| | | Antenna power ratio | | | |
| OL | Pr. Det. (%) | 100 | 94.8718 | 97.7058 | 99.3252 |
| | Pr. FA (%) | 0 | 2.969 | 1.7544 | 0.7422 |
| NOL | Pr. Det. (%) | 100 | 99.8596 | 96.4912 | 100 |
| | Pr. FA (%) | 0 | 5.9379 | 11.5385 | 6.7476 |

As can be noted in Table 1, the first metric (SINR) yields better performance than the second metric (Antenna power ratio). In Table 1 this is true for all cases tested.

TABLE 2

Performance results for presence detection at $SINR_{cell2} = -6$ dB, $\lambda_{rsxx} = 2^{-6}$

| | AWGN | EPA5 | ETU70 | ETU300 |
|---|---|---|---|---|
| | SINR | | | |
| Pr. Det. (%) | 100 | 100 | 100 | 100 |
| Pr. FA (%) | 0 | 0 | 0 | 0 |
| | Antenna power ratio | | | |
| Pr. Det. (%) | 100 | 94.3094 | 100 | 100 |
| Pr. FA (%) | 0 | 0 | 0 | 0 |
| | SINR and Antenna power ratio | | | |
| Pr. Det. (%) | 92.3767 | 83.4081 | 99.1031 | 99.3274 |
| Pr. FA (%) | 0 | 0 | 0 | 0 |

Also in Table 2 the first metric yields the best results. In fact, for the results in Table 2 using only the first metric indicates superior performance than using both the first metric and the second metric. One reason for using a combination of the first metric and the second metric is to ensure that the probability of false alarm (Pr. FA) is minimized since, in general terms the requirement on false alarm are stricter (which may be in the order of <0.1%) than the probability of detection (which may be in the order of >90%). Thus, although the probability for detection (Pr. Det.) may decrease by using both metrics one benefit may be to ensure that the probability of false alarm is kept at a minimum.

Further, the antenna power ratio metric may become more relevant for scenarios relating to transmit antennas with different powers. For example, when the antennas are separated in distributed antenna system, the distance from the UE 4 to Tx0 at network node 2a may be different from that to Tx1 at network node 2b. The antenna power ratio metric allows measurements regarding whether the UE 4 identifies one transmit antenna to have higher power than the other transmit antenna and thereby enables the UE 4 to switch off measurements from the weaker antenna if the antenna power ratio is outside the threshold region.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although the enclosed embodiments are based on a UE 4 comprising two receive antenna ports, the herein disclosed subject matter is equally applicable to a UE 4 comprising a single receive antenna port.

The invention claimed is:

1. A method, implemented by a user equipment, for detecting presence of a second transmit antenna port in a distributed antenna port system, the method comprising:
    receiving cell-specific reference signals (CRS) on a first receive antenna port of the user equipment and a second receive antenna port of the user equipment, the CRS having been transmitted by a first transmit antenna port and a second transmit antenna port in the distributed antenna port system;
    estimating reference signal received power (RSRP) measurements from the CRS for a first plurality of distinct transmit-receive antenna port combinations, wherein the estimating of the RSRP measurements comprises:
        estimating a first RSRP measurement from the CRS for a first transmit-receive antenna port combination comprising the first receive antenna port and the first transmit antenna port;
        estimating a second RSRP measurement from the CRS for a second transmit-receive antenna port combination comprising the first receive antenna port and the second transmit antenna port;
        estimating a third RSRP measurement from the CRS for a third transmit-receive antenna port combination comprising the second receive antenna port and the first transmit antenna port;
        estimating a fourth RSRP measurement from the CRS for a fourth transmit-receive antenna port combination comprising the second receive antenna port and the second transmit antenna port;
    filtering the RSRP measurements so as to obtain filtered RSRP measurements;
    estimating reference signal resource element received power (RSRERP) measurements from the CRS for a second plurality of distinct transmit-receive antenna port combinations, wherein the estimating of the RSRERP measurements comprises:
        estimating a first RSRERP measurement from the CRS for the second transmit-receive antenna port combination;
        estimating a second RSRERP measurement from the CRS for the fourth transmit-receive antenna port combination;
    filtering the RSRERP measurements so as to obtain filtered RSRERP measurements;
    determining a signal to interference and noise ratio (SINR) based on the filtered RSRP measurements and the filtered RSRERP measurements;
    determining, based on comparing the SINR to a first threshold (SINRthr), whether the second transmit antenna port is present or not.

2. The method of claim 1, further comprising, in response to determining that the second transmit antenna port is present, continuing measuring from the second transmit antenna port.

3. The method of claim 1, further comprising, in response to determining that the second transmit antenna port is present, skipping reception on the first receive antenna port during a next measurement occasion.

4. The method of claim 1, further comprising, in response to determining that the second transmit antenna port is not present, disabling measuring from the second transmit antenna port.

5. The method of claim 1, where there are $N_r$ receive antenna ports and wherein SINR for measurement occasion m is determined as:

$$SINR(m) = \frac{1}{N_r} \sum_{i=0}^{N_r-1} \frac{RSRP_{Rxi}^{Tx1}(m)}{RSRERP_{Rxi}^{Tx1}(m)},$$

where $RSRP_{Rxi}^{Tx1}(m)$ is the filtered RSRP for the second transmit antenna port at the i:th receive antenna port, and where $RSRERP_{Rxi}^{Tx1}(m)$ is the filtered RSRERP for the second transmit antenna port at the i:th receive antenna port.

6. The method of claim 1, further comprising:
    determining an antenna power ratio (G) based on the filtered RSRP of the second transmit antenna port and the filtered RSRP of the first transmit antenna port;
    determining whether the second transmit antenna port is present or not also based on comparing the G to a second threshold (Gthr).

7. The method of claim 6, where there are $N_r$ receive antenna ports and wherein G is determined as:

$$G(m) = \frac{1}{N_r} \sum_{i=0}^{N_r-1} \frac{RSRP_{Rxi}^{Tx1}(m)}{RSRP_{Rxi}^{Tx0}(m)},$$

where $RSRP_{Rxi}^{Tx1}(m)$ is the filtered RSRP for the second transmit antenna port at the i:th receive antenna port and where $RSRP_{Rxi}^{Tx0}(m)$ is the filtered RSRP for the first transmit antenna port at the i:th receive antenna port.

8. A user equipment for detecting presence of a second transmit antenna port in a distributed antenna port system, the user equipment comprising:
    a first receive antenna port and a second receive antenna port arranged to receive cell-specific reference signals (CRS), the CRS having been transmitted by a first transmit antenna port and a second transmit antenna port in the distributed antenna port system;
    a processing circuit configured to:
        estimate reference signal received power (RSRP) measurements from the CRS for a first plurality of distinct transmit-receive antenna port combinations, wherein to estimate the RSRP measurements the processing circuit is configured to at least:
            estimate a first RSRP measurement from the CRS for a first transmit-receive antenna port combination comprising the first receive antenna port and the first transmit antenna port;

estimate a second RSRP measurement from the CRS for a second transmit-receive antenna port combination comprising the first receive antenna port and the second transmit antenna port;
estimate a third RSRP measurement from the CRS for a third transmit-receive antenna port combination comprising the second receive antenna port and the first transmit antenna port;
estimate a fourth RSRP measurement from the CRS for a fourth transmit-receive antenna port combination comprising the second receive antenna port and the second transmit antenna port;
filter the RSRP measurements so as to obtain filtered RSRP measurements;
estimate reference signal resource element received power (RSRERP) measurements from the CRS for a second plurality of distinct transmit-receive antenna port combinations, wherein to estimate the RSRERP measurements, the processing circuit is configured to:
estimate a first RSRERP measurement from the CRS for the second transmit-receive antenna port combination;
estimate a second RSRERP measurement from the CRS for the fourth transmit-receive antenna port combination;
filter the RSRERP measurements so as to obtain filtered RSRERP measurements;
determine a signal to interference and noise ratio (SINR) based on the filtered RSRP measurements and the filtered RSRERP measurements;
determine, based on comparing the SINR to a first threshold (SINRthr), whether the second transmit antenna port is present or not.

9. The user equipment of claim 8, wherein the processing circuit configured to, in response to determining that the second transmit antenna port is present, continue measuring from the second transmit antenna port.

10. The user equipment of claim 8, wherein the processing circuit configured to, in response to determining that the second transmit antenna port is present, skip reception on the first receive antenna port during a next measurement occasion.

11. The user equipment of claim 8, wherein the processing circuit configured to, in response to determining that the second transmit antenna port is not present, disable measuring from the second transmit antenna port.

12. The user equipment of claim 8, wherein the processing circuit configured to:
determine an antenna power ratio (G) based on the filtered RSRP of the second transmit antenna port and the filtered RSRP of the first transmit antenna port;
determine whether the second transmit antenna port is present or not also based on comparing the G to a second threshold (Gthr).

13. A computer program product stored in a non-transitory computer readable medium for detecting presence of a second transmit antenna port in a distributed antenna port system, the computer program product comprising software instructions which, when run on a processing circuit of a user equipment, causes the user equipment to:
receive cell-specific reference signals (CRS) on a first receive antenna port of the user equipment and a second receive antenna port of the user equipment, the CRS having been transmitted by a first transmit antenna port and a second transmit antenna port in the distributed antenna port system;
estimate reference signal received power (RSRP) measurements from the CRS for a first plurality of distinct transmit-receive antenna port combinations, wherein the estimating of the RSRP measurements comprises:
estimating a first RSRP measurement from the CRS for a first transmit-receive antenna port combination comprising the first receive antenna port and the first transmit antenna port;
estimating a second RSRP measurement from the CRS for a second transmit-receive antenna port combination comprising the first receive antenna port and the second transmit antenna port;
estimating a third RSRP measurement from the CRS for a third transmit-receive antenna port combination comprising the second receive antenna port and the first transmit antenna port;
estimating a fourth RSRP measurement from the CRS for a fourth transmit-receive antenna port combination comprising the second receive antenna port and the second transmit antenna port;
filter the RSRP measurements so as to obtain filtered RSRP measurements;
estimate reference signal resource element received power (RSRERP) measurements from the CRS for a second plurality of distinct transmit-receive antenna port combinations, wherein the estimating of the RSRERP measurements comprises:
estimating a first RSRERP measurement from the CRS for the second transmit-receive antenna port combination;
estimating a second RSRERP measurement from the CRS for the fourth transmit-receive antenna port combination;
filter the RSRERP measurements so as to obtain filtered RSRERP measurements;
determine a signal to interference and noise ratio (SINR) based on the filtered RSRP measurements and the filtered RSRERP measurements;
determine, based on comparing the SINR to a first threshold (SINRthr), whether the second transmit antenna port is present or not.

* * * * *